Aug. 14, 1956        E. THIELE        2,758,753
SPRINKLING POT FOR CONDIMENTS, MORE
PARTICULARLY FOR SALT AND SUGAR
Filed July 15, 1954

INVENTOR
Edmund Thiele

By Norris & Bateman
ATTORNEYS.

United States Patent Office 2,758,753
Patented Aug. 14, 1956

2,758,753

SPRINKLING POT FOR CONDIMENTS, MORE PARTICULARLY FOR SALT AND SUGAR

Edmund Thiele, Wiesbaden, Germany

Application July 15, 1954, Serial No. 443,609

Claims priority, application Germany September 5, 1953

3 Claims. (Cl. 222—151)

Containers which have hitherto been used for sprinkling condiments have the disadvantage that the distributing apertures frequently become blocked; this occurs more especially in salt-cellars owing to the hygroscopic properties of rock salt. It is also possible for the small openings to be blocked up in the case of other substances to be sprinkled, such as sugar. The object of the invention is to overcome these disadvantages by providing the small container, which is made of procelain, glass or other material, with a lid consisting of two parts. The lower lid contains fine openings which are required for the passage of the substance to be sprinkled, whereas the upper lid is provided with spikes or needle-points which project into the openings in such manner that when the upper lid is raised the openings in the lid portion are freed and allow the substance to be sprinkled through the said openings by means of a shaking movement. Between the fine openings, the lower lid portion is likewise provided, according to the invention, with spikes, so that the shaking of the container causes the salt or sugar to be very finely comminuted and divided. The lower and upper lid portions are connected together in hinged fashion and are held together by springs acting against both portions. The connection is furthermore so constructed that when the upper lid portion which is provided with spikes is lifted upwards it remains in this position. Only after pressure is applied by a finger is the upper lid swung back on to the lower lid so that the spikes penetrate into the openings and are covered by the upper lid. The lower part of the relatively high lower lid portion has a box-section hollow projection whilst the upper lid portion has two flat projections which are pivotally mounted on a pin of the lower portion. The two lids are connected together by a spring of considerable length arranged in the box-section part, so that a strong traction can be exerted by the spring. Consequently the upper lid is pressed down firmly so that it seals the container in an air-tight manner and prevents moisture from being absorbed, so that the salt or sugar always remains dry. One constructional example of the invention is shown in the drawings.

Figure 2:
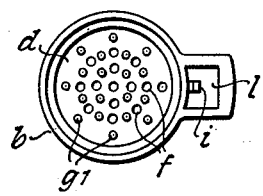
Figs. 2–7 show details of the two-part lid.
Figure 5:
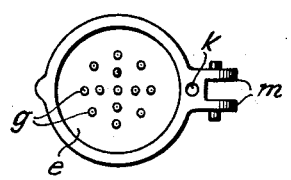
Figure 3:
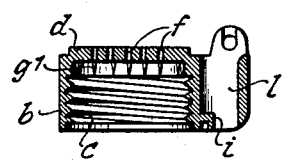
Figure 6:
Figure 4:
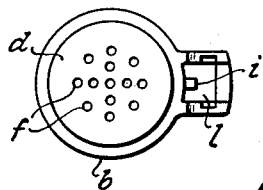
Figure 7:
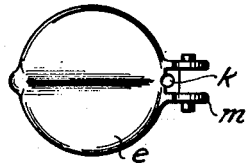
Figure 1:
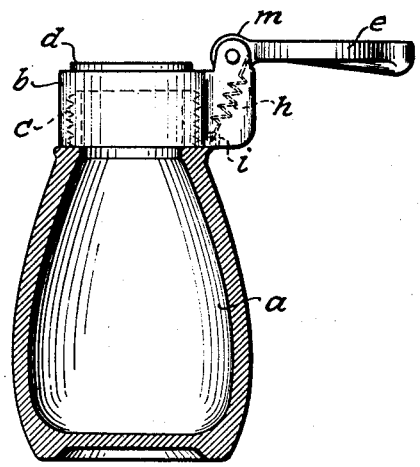
Fig. 1 shows the sprinkling container.

The sprinkling container with a neck $b$ is designated by $a$, the neck being usually provided with a screwthread $c$. Screwed on to the neck is the lower lid portion $d$. The upper lid portion is designated by $e$ and is formed with the spikes $g$ penetrating into the openings $f$. Arranged on the lower side of the lower lid portion $b$, between the fine openings $f$, are spikes $g_1$ which, when the container is shaken, separate once more the agglomerated grains of salt or sugar. The hollow box-section projection 1 has a hook $i$ on which is suspended the spring $h$ whose upper end is suspended in the opening $k$ of the upper lid $l$. The two flat projections of the upper lid portion are designated by $m$. It is also possible to use a bayonet catch or other catch instead of a screwthread for connecting the lower lid portion. The individual parts may be made from metal or from procelain, glass, polystyrene or other substance. This sprinkler is also suitable for pepper, paprika and other condiments.

I claim:

1. A condiment sprinkler comprising a lower body member having a perforated cover and means for detachably securing the body member to a container, an upper lid member pivotally connected to the body member to swing to and from closed position relatively to the body member, said members being engageable when the lid member is closed to form an air-seal between said members, spikes projecting downwardly from the lower side of the cover of the body member, and spikes projecting from the lower side of the lid member and positioned thereon to penetrate the perforations in the cover of the body member when the lid member is closed.

2. A condiment sprinkler as defined in claim 1, including a spring operative to hold the lid member in both open and closed positions and to press the lid member firmly into closed air-sealing engagment with the body member.

3. A condiment sprinkler as defined in claim 2, wherein said air-tight seal is formed by complemental flange and groove portions of said members which inter-engage when the lid member is closed.

References Cited in the file of this patent

UNITED STATES PATENTS

| | | |
|---|---|---|
| 843,356 | Parker | Feb. 5, 1907 |
| 875,531 | Kampfe | Dec. 31, 1907 |
| 1,033,689 | Fuchs | July 23, 1912 |
| 1,139,841 | Bright | May 18, 1915 |
| 1,213,634 | Havassy | Jan. 23, 1917 |